Aug. 28, 1962 T. L. FAWICK 3,051,511
HOSE COUPLING HAVING FLUID PRESSURE BALANCING MEANS
Filed July 14, 1958
FIG. 1
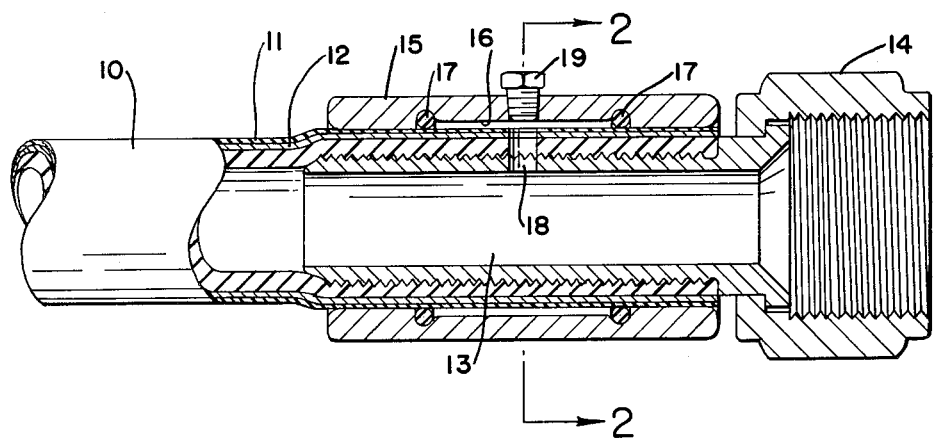
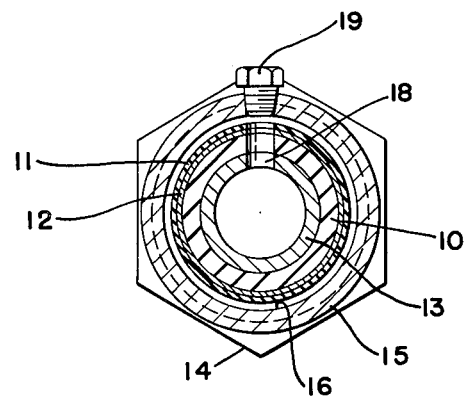
FIG. 2
INVENTOR.
THOMAS L. FAWICK
BY
Willard D. Eakin
ATTORNEY

United States Patent Office 3,051,511
Patented Aug. 28, 1962

3,051,511
HOSE COUPLING HAVING FLUID PRESSURE BALANCING MEANS
Thomas L. Fawick, Statler Hotel, Cleveland, Ohio
Filed July 14, 1958, Ser. No. 748,356
2 Claims. (Cl. 285—106)

This invention relates to hose couplings and is of especial advantage in the case of hose required to withstand extremely high internal pressure, involving the danger of a leak being produced by expansion of the hose in the vicinity of the coupling.

Its chief objects are to provide a dependable leak-proof coupling for such a hose; to provide simplicity and economy of structure and facility of assembly and disassembly of the parts; and to provide a coupling that can be dismounted, for re-use, without damage to any of its parts.

Of the accompanying drawings:

FIG. 1 is a longitudinal section of a coupling assembly embodying my invention in its preferred form.

FIG. 2 is a section on line 2—2 of FIG. 1.

The assembly comprises the end portion of a hose 10 having an at least moderately smooth outer surface, such as is provided in the present instance by a thin, cured in place, surface layer 11 of rubber or the like. The particular hose here shown is of the high-pressure type, having a braided-wire reinforcement or jacket 12 incorporated as a part of its wall.

The coupling comprises a threaded nipple 13 swiveled in a coupling collar 14 and screwed into the end of the hose, with a sufficiently tight fit to stress the wall of the hose appreciably and thus provide initial sealing of the hose to the nipple.

Preferably mounted upon the hose before the screwing of the nipple into it is a metal sleeve 15 of such size as to be frictionally retained in place. In its middle part the sleeve 15 is internally formed with an axially extensive annular groove 16 which at each end terminates in a deeper annular groove providing a seat for an O ring or "soft packing" 17 which, as self-energizing sealing means, seals against the outer surface of the hose.

To permit pressure fluid to flow from the interior of the nipple into the groove 16 a hole 18 extends through the wall of the nipple and the wall of the hose. The hole 18 can be advantageously provided by first assembling the several parts, then drilling through the sleeve and through the hose wall and the nipple wall, and thereafter closing the hole in the sleeve, as by means of a screw plug 19.

In service the fluid in the groove 16 applies to the exterior of the hose a pressure per square inch which is at all times the same as the fluid pressure within the hose and expansion of the hose in the part surrounded by the groove is prevented, so that the initial sealing pressure of the nipple against the hose is preserved, however great a pressure may be given to the conducted fluid.

No bending or upsetting of metal is involved in the assembling or disassembling of the parts, and consequently they can be used repeatedly, if need be, for successive coupling assemblies.

The appended claims are inclusive of possible modifications.

I claim:

1. A hose coupling assembly comprising a hose of elastomeric material having an annular wall which is expandable radially outward under pressure at the inside of the hose, a rigid annular nipple tightly received inside the hose in fluid-tight engagement with said annular hose wall at one end of the hose, a rigid annular sleeve at the outside of said hose wall extending around the hose and said nipple at said one end of the hose, said sleeve being insertable endwise onto the hose prior to the insertion of said nipple therein, said sleeve having at its inside circumference an annular groove of substantial axial length extending around the outside of the hose, said nipple when inside the hose forcing the contiguous portion of the hose wall radially outward tightly against the portions of said sleeve axially outwardly of said groove, said nipple and said contiguous portion of the hose wall each having at least one transverse opening therein in radial registration forming a registered opening which provides fluid communication between the interior of the nipple and said internal groove in the sleeve, said sleeve having transverse opening means therein which extends from the outside of the sleeve to said internal groove, said sleeve opening and said registered opening being at substantially the same axial and radial position along the hose, closure means closing said transverse opening means in the sleeve in fluid tight fashion, and means carried by said sleeve at the opposite ends of said recess and deformable under pressure to provide fluid tight seals between the sleeve and the outside of the hose, whereby pressure fluid within said hose is communicated through said registering transverse openings in said nipple and said hose wall into said annular groove to press said hose wall radially inward against said nipple, said nipple being removable from said hose, and said sleeve being removable endwise from said hose after the removal of said nipple.

2. The hose coupling assembly of claim 1 wherein said nipple has external screw threads engaging the inside of the hose, and wherein said last-mentioned means are O-rings at opposite ends of said internal groove engaging the outside of the hose.

References Cited in the file of this patent

UNITED STATES PATENTS

| 1,151,614 | Putnam | Aug. 31, 1915 |
| 2,244,280 | Aghnider | June 3, 1941 |
| 2,369,823 | Freed | Feb. 20, 1945 |
| 2,485,976 | Main | Oct. 25, 1949 |
| 2,546,961 | Amero | Apr. 3, 1951 |
| 2,749,150 | Kaiser | June 5, 1956 |
| 2,781,206 | Ragland | Feb. 12, 1957 |
| 2,837,353 | Ashbrook | June 3, 1958 |

FOREIGN PATENTS

| 576,772 | Great Britain | Apr. 17, 1946 |